US012798452B2

(12) United States Patent
Chen et al.

(10) Patent No.: US 12,798,452 B2
(45) Date of Patent: Nov. 17, 2026

(54) CHILD SAFETY SEAT

(71) Applicant: Wonderland Switzerland AG, Steinhausen (CH)

(72) Inventors: Yingzhong Chen, Steinhausen (CH); Zujian Liu, Steinhausen (CH)

(73) Assignee: WONDERLAND SWITZERLAND AG, Steinhausen (CH)

( * ) Notice: Subject to any disclaimer, the term of this patent is extended or adjusted under 35 U.S.C. 154(b) by 82 days.

(21) Appl. No.: 18/290,605

(22) PCT Filed: Jul. 29, 2022

(86) PCT No.: PCT/EP2022/071417

§ 371 (c)(1),
(2) Date: Jan. 19, 2024

(87) PCT Pub. No.: WO2023/006981

PCT Pub. Date: Feb. 2, 2023

(65) Prior Publication Data

US 2024/0227636 A1 Jul. 11, 2024

(30) Foreign Application Priority Data

Jul. 30, 2021 (CN) ......................... 202110872453.3
Dec. 31, 2021 (CN) ......................... 202111662203.3

(51) Int. Cl.
*B60N 2/28* (2006.01)

(52) U.S. Cl.
CPC ......... *B60N 2/2851* (2013.01); *B60N 2/2881* (2013.01)

(58) Field of Classification Search
CPC .. B60N 2/2851; B60N 2/2872; B60N 2/2881; B60N 2/2884
See application file for complete search history.

(56) References Cited

U.S. PATENT DOCUMENTS 5,735,576 A * 4/1998 Pepys ...................... B60N 2/80 297/DIG. 6
5,916,089 A 6/1999 Ive
(Continued)

FOREIGN PATENT DOCUMENTS

AU 2013248252 B2 9/2017
AU 2017279736 A1 7/2018
(Continued)

OTHER PUBLICATIONS

JP Office Action with English Translation for Application No. 2024-504165; Date Mailed: Apr. 1, 2025; pp. 1-10.
(Continued)

*Primary Examiner* — Chi Q Nguyen
(74) *Attorney, Agent, or Firm* — CANTOR COLBURN LLP

(57) ABSTRACT

A child safety seat includes a seat body, a headrest and a first buffer. The seat body has two seat side wings which are oppositely disposed. The first buffer is disposed along an inner side wall of the headrest, and the first buffer includes at least one first buffer layer and at least one second buffer layer. A hardness of the second buffer layer is less than that of the first buffer layer. The second buffer layer is fixed on a side of the first buffer layer and adjacent to the inner side wall of the headrest, and the first buffer layer is located at a side away from the inner side wall of the headrest.

33 Claims, 16 Drawing Sheets

(56) References Cited

U.S. PATENT DOCUMENTS

| | | | | |
|---|---|---|---|---|
| 6,623,074 | B2 * | 9/2003 | Asbach | B60N 2/2851 297/484 |
| 6,857,700 | B2 * | 2/2005 | Eastman | B60N 2/2872 297/256.16 |
| 7,631,935 | B2 | 12/2009 | Chen et al. | |
| 9,452,694 | B2 * | 9/2016 | Brady | A47C 7/624 |
| 11,192,654 | B2 * | 12/2021 | Ruiz Lara | B60N 2/643 |
| 12,134,339 | B2 * | 11/2024 | Harmes, V | B60N 2/265 |
| 2002/0153753 | A1 | 10/2002 | Kassai | |
| 2010/0078976 | A1 | 4/2010 | Hou et al. | |
| 2012/0181829 | A1 * | 7/2012 | Williams | B60N 2/2845 297/250.1 |
| 2015/0375641 | A1 | 12/2015 | Van Mourik et al. | |
| 2017/0349065 | A1 * | 12/2017 | Pleiman | B60N 2/2851 |
| 2019/0031960 | A1 | 1/2019 | Kou et al. | |
| 2023/0406169 | A1 * | 12/2023 | Zhang | B60N 2/2812 |
| 2024/0326666 | A1 * | 10/2024 | Oltman | B60N 2/2884 |

FOREIGN PATENT DOCUMENTS

| | | | |
|---|---|---|---|
| CN | 1572601 | A | 2/2005 |
| CN | 102424028 | A | 4/2012 |
| CN | 104385948 | A | 3/2015 |
| CN | 104553901 | A | 4/2015 |
| CN | 105398359 | A | 3/2016 |
| CN | 109094435 | A | 12/2018 |
| CN | 109263196 | A | 1/2019 |
| CN | 109278602 | A | 1/2019 |
| CN | 209955816 | U | 1/2020 |
| CN | 112739573 | A | 4/2021 |
| DE | 102014220658 | A1 | 4/2015 |
| JP | 2001114001 | A | 4/2001 |
| JP | 2016055862 | A | 4/2016 |
| JP | 2021084473 | A | 6/2021 |

OTHER PUBLICATIONS

JP Search Report with English Translation for Application No. 2024-504165; Date Mailed: Feb. 18, 2025; pp. 1-217.

Taiwanese Application No. 111128565; Office Action after the retrial dated Apr. 30, 2025; pp. 1-30.

Taiwanese Application No. 113134545; 1st Office Action dated May 8, 2025; pp. 1-25.

International Search Report for International Application No. PCT/EP2022/071417; International Filing Date: Jul. 29, 2022; Date of Mailing: Dec. 8, 2022; 3 pages.

Taiwanese Application No. 111128565; 1st Office Action dated Dec. 15, 2023; 11 pages.

Written Opinion for International Application No. PCT/EP2022/071417; International Filing Date: Jul. 29, 2022; Date of Mailing: Dec. 8, 2022; 4 pages.

AU 2nd Office Action; App No. 2022319973; Date Mailed: Nov. 25, 2025; pp. 1-5.

EP Communication Pursuant to Article 94(3) EPC; Appl No. 22758495.0-1009; Date Mailed: Nov. 5, 2025; pp. 1-6.

TW Notice of Allowance with English Translation; App No. 111128565; Date Mailed: Nov. 25, 2025; pp. 1-20.

CN 1st Office Action with English Translation; App No. 202111662203.3; Date Mailed: Feb. 28, 2026; pp. 1-32.

CN 2nd Office Action with English Translation; App No. 202111662203.3; Date Mailed: Jul. 6, 2026; pp. 1-38.

* cited by examiner

CHILD SAFETY SEAT

This application is a National Stage application of PCT/EP2022/071417, filed on Jul. 29, 2022, which claims the benefit of Chinese Application No. 202110872453.3, filed on Jul. 30, 2021 and Chinese Application No. 202111662203.3, filed on Dec. 31, 2021, all of which are incorporated herein by reference in their entirety.

TECHNICAL FIELD

The present disclosure relates to the technical field of baby carriers, in particular to a child safety seat having a buffer structure and low weight.

BACKGROUND

Child safety seat is a device installed on a seat of a vehicle for an infant to sit. In case of emergency braking or accidental collision of the vehicle, a housing of the child safety seat may reduce the impact on the infant, and a binding device thereon may also limit the movement of the child's body, so as to reduce the probability of injury to the child in accidents and ensure the travel safety of the child.

In order to offer a better riding safety of the child, the existing child safety seat is integrally provided with a buffer structure along an inner or outer side of its seat body. This buffer structure may provide better protection for the child, however, it increases the weight and production cost of the child safety seat.

Some of the child safety seats currently on the market are usually covered with a large area of seat buffering foam in order to ensure the comfort and safety, leading to high weight and high cost of the child safety seat.

Therefore, it is necessary to provide a child safety seat having simple structure, good protection for a child, and reduced weight and cost, so as to solve the above problems.

SUMMARY

An objective of the present disclosure is to provide a child safety seat having simple structure, good protection for an infant, and reduced weight and cost.

In order to achieve the above objective, the present disclosure provides a child safety seat including a seat body, a headrest and a first buffer. The seat body has two seat side wings which are oppositely disposed. The headrest is installed on the seat body. The first buffer is disposed along an inner side wall of the headrest, and the first buffer includes at least one first buffer layer and at least one second buffer layer. A hardness of the second buffer layer is less than that of the first buffer layer. The second buffer layer is fixed on a side of the first buffer layer and adjacent to the inner side wall of the headrest, and the first buffer layer is located at a side away from the inner side wall of the headrest.

Preferably, the headrest has two headrest side wings which are oppositely disposed, and the first buffer is disposed at least along an inner side wall of one of the two headrest side wings.

Preferably, the child safety seat of the present disclosure further includes a headrest cover sleeved outside the headrest, and the first buffer is fixed on the inner side wall of one of the headrest side wings or located inside the headrest cover and attached to the inner side wall of one of the headrest side wings.

Preferably, the inner side wall of one of the headrest side wings is concavely provided with a fixing groove, the first buffer is accommodated in the fixing groove, and a surface of the first buffer layer forms a smooth transition with the inner side wall of the headrest.

Preferably, the child safety seat of the present disclosure further includes a second buffer, which is disposed along an inner side wall of one of the two seat side wings and located below the headrest.

Preferably, the seat body further includes a seat portion and a backrest portion disposed above the seat portion, each of the seat side wings extends along an up-down direction of the seat body and is connected to the seat portion and the backrest portion, the headrest is installed on the backrest portion, and the second buffer is disposed in an area between the headrest and the seat portion in a height direction of the seat body.

Preferably, the child safety seat of the present disclosure further includes a cushion sleeved outside the seat body, and the second buffer is fixed on the inner side wall of one of the seat side wings or located inside the cushion and attached to the inner side wall of one of the seat side wings.

Preferably, the child safety seat of the present disclosure further includes a small cushion disposed on the seat body, the small cushion is provided with two shoulder supporting portions which are oppositely disposed, the two shoulder supporting portions are attached to the inner side walls of the two seat side wings respectively, and the second buffer may also be located inside one of the shoulder supporting portions.

Preferably, the cushion is provided with two pockets at positions corresponding to the inner side walls of the two seat side wings, the two pockets are symmetrically disposed below the headrest, and the second buffer is located inside one of the pockets.

Preferably, each of the pockets has an opening, and the second buffer is detachably located inside one of the pockets through the opening.

Preferably, the second buffer includes at least one first buffer layer.

Preferably, the first buffer layer of the first buffer is integrally formed by an expanded material (i.e., foamed material), and a thickness of the first buffer layer of the first buffer is 5 mm to 25 mm.

Preferably, the first buffer layer of the second buffer is integrally formed by an expanded material (i.e., foamed material), and a thickness of the first buffer layer of the second buffer is 5 mm to 25 mm.

Preferably, the first buffer layer of the first buffer is integrally formed by any one of expandable polyethylene, expanded polypropylene, expanded polystyrene, and expandable polyolefins.

Preferably, the first buffer layer of the second buffer is integrally formed by any one of expandable polyethylene, expanded polypropylene, expanded polystyrene, and expandable polyolefins.

Preferably; the second buffer further includes at least one second buffer layer fixed on a side of the first buffer layer of the second buffer and adjacent to the inner side wall of one of the seat side wings, and the first buffer layer of the second buffer is located on a side away from the inner side wall of the seat side wing.

Preferably, the first buffer further includes at least one third buffer layer, a hardness of the third buffer layer is less than that of the first buffer layer of the first buffer, and the third buffer layer is fixed on a side of the first buffer layer of the first buffer away from the second buffer layer of the first buffer.

Preferably, the second buffer further includes at least one third buffer layer, a hardness of the third buffer layer of the second buffer is less than that of the first buffer layer of the second buffer, and the third buffer layer of the second buffer is fixed on a side of the first buffer layer of the second buffer away from the second buffer layer of the second buffer.

Preferably, the second buffer layer of the first buffer and the third buffer layer of the first buffer are both foam layers, and a thickness of the second buffer layer of the first buffer is 10 mm to 40 mm.

Preferably, the second buffer layer of the second buffer and the third buffer layer of the second buffer are both foam layers, and a thickness of the second buffer layer of the second buffer is 10 mm to 40 mm.

In another aspect of the present disclosure, a child safety seat is provided. The child safety seat includes a seat body and a headrest installed on the seat body, the seat body having two seat side wings which are oppositely disposed. The child safety seat further includes a second buffer disposed along an inner side wall of one of the two seat side wings and located below the headrest.

Preferably, the seat body further comprises a seat portion and a backrest portion disposed above the seat portion, each of the seat side wings extends along an up-down direction of the seat body and is connected to the seat portion and the backrest portion, the headrest is installed on the backrest portion, and the second buffer is disposed in an area between the headrest and the seat portion in a height direction of the seat body.

Preferably; the child safety seat further comprises a cushion sleeved outside the seat body, and the second buffer is fixed on the inner side wall of one of the seat side wings or located inside the cushion and attached to the inner side wall of one of the seat side wings.

Preferably, the child safety seat further comprises a small cushion disposed on the seat body, the small cushion has two shoulder supporting portions which are oppositely disposed, the two shoulder supporting portions are attached to the inner side walls of the two seat side wings respectively, and the second buffer is located inside one of the shoulder supporting portions.

Preferably, the child safety seat further comprises a cushion sleeved outside the seat body, the cushion is provided with two pockets at positions corresponding to the inner side walls of the seat side wings, the two pockets are symmetrically disposed below the headrest, and the second buffer is located inside one of the pockets.

Preferably, the cushion is provided with two pockets at positions corresponding to the inner side walls of the seat side wings, the two pockets are symmetrically disposed below the headrest, and the second buffer is located inside one of the pockets.

Preferably, each of the pockets has an opening, and the second buffer is detachably located inside one of the pockets through the opening.

Preferably, the second buffer comprises at least one first buffer layer.

Preferably, the first buffer layer is integrally formed by an expanded material, and a thickness of the first buffer layer is 5 mm to 25 mm.

Preferably, the first buffer layer is integrally formed by any one of expandable polyethylene, expanded polypropylene, expanded polystyrene, and expandable polyolefins.

Preferably, the second buffer further comprises at least one second buffer layer fixed on a side of the first buffer layer and adjacent to the inner side wall of one of the seat side wings, and the first buffer layer is located on a side away from the inner side wall of the seat side wing.

Preferably, the second buffer further comprises at least one third buffer layer, a hardness of the third buffer layer is less than that of the first buffer layer, and the third buffer layer is fixed on a side of the first buffer layer away from the second buffer layer.

Preferably, the second buffer layer and the third buffer layer are both foam layers, and a thickness of the second buffer layer is 10 mm to 40 mm.

Preferably, a distance from an upper edge of the second buffer to the seat portion is 200 mm to 400 mm, and an area of a surface of the second buffer contacting with a side of an infant is 4000 $mm^2$ to 20000 $mm^2$.

Preferably, the second buffer is connected to one of the seat side wings by means of a hook-loop fastener.

Compared with the prior art, the child safety seat provided by the present disclosure is only provided with the first buffer along the inner side wall of the headrest and/or the second buffer at the position of the shoulder, and there is no buffer structure provided at other positions of the seat body, so that compared with the prior art, the child safety seat of the present disclosure omitting most of the buffer structures can still have a good protective effect on the child, and reduce the weight of the whole buffer structure, thereby simultaneously reducing the weight and manufacturing cost of the child safety seat. In addition, the first buffer/second buffer is composed of the first buffer layer and the second buffer layer with different hardness, so that on the premise of ensuring better buffering performance, the child safety seat of the present disclosure has better comfort, simple structure and easier production and manufacturing, thus further saving the cost of the child safety seat and its buffer structure.

DETAILED DESCRIPTION

Figure 1:
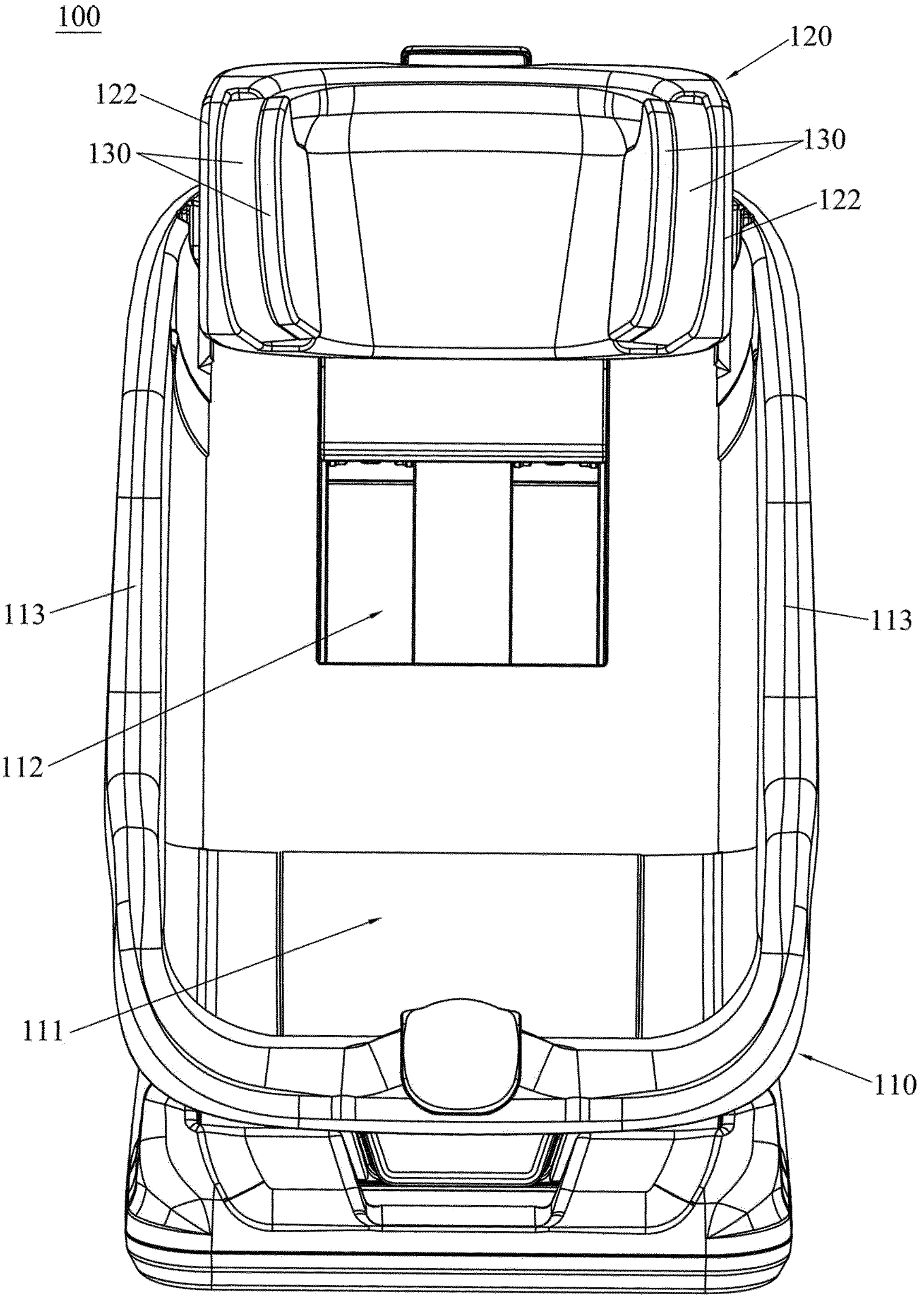
FIG. 1 is a structural schematic view of a child safety seat in a first embodiment of the present disclosure.

Embodiments of the present disclosure will now be described with reference to the accompanying drawings, in which like elements are represented by like reference numbers. In addition, the positional relationships indicated by orientation descriptions such as "up", "down", "left", "right", "front", "rear" or the like mentioned in the present disclosure are based on orientations or positional relationships shown in the drawings, which are only intended for convenience of describing the technical solutions of the present application and/or simplifying the description, instead of indicating or implying that the referred devices or elements must have a specific orientation, be constructed and operated in a specific orientation, and therefore cannot be understood as a limitation of the present application.

Referring to FIGS. 1-12, the child safety seat 100 provided by the present disclosure at least includes a seat body 110, a headrest 120 and a first buffer 130. The seat body 110 includes a seat portion 111 and a backrest portion 112 disposed above the seat portion 111. Each of two opposite sides of the seat body 110 is provided with a seat side wing 113, and each of seat side wings 113 extends along the up-down direction to a top end of the backrest portion 112 and a front end of the seat portion 111. The headrest 120 is installed on the backrest portion 112 of the seat body 110, and an installing manner between the headrest 120 and the backrest portion 112 is conventional in the art and will not be described in detail. In the present disclosure, the first buffer 130 is disposed along the inner side wall of the headrest 120 to protect the head of an infant.

More preferably, the child safety seat 100 of the present disclosure may further include a second buffer 140 disposed along an inner side wall of each of two seat side wings 113, and in a height direction of the child safety seat 100, the second buffer 140 is disposed in an area between the headrest 120 and the seat portion 111 for protecting the shoulder of the infant.

With reference to FIGS. 1-17, specific structures and arrangements of the first buffer 130 and the second buffer 140 in different embodiments of the child safety seat 100 of the present disclosure will be described.

Figure 2:
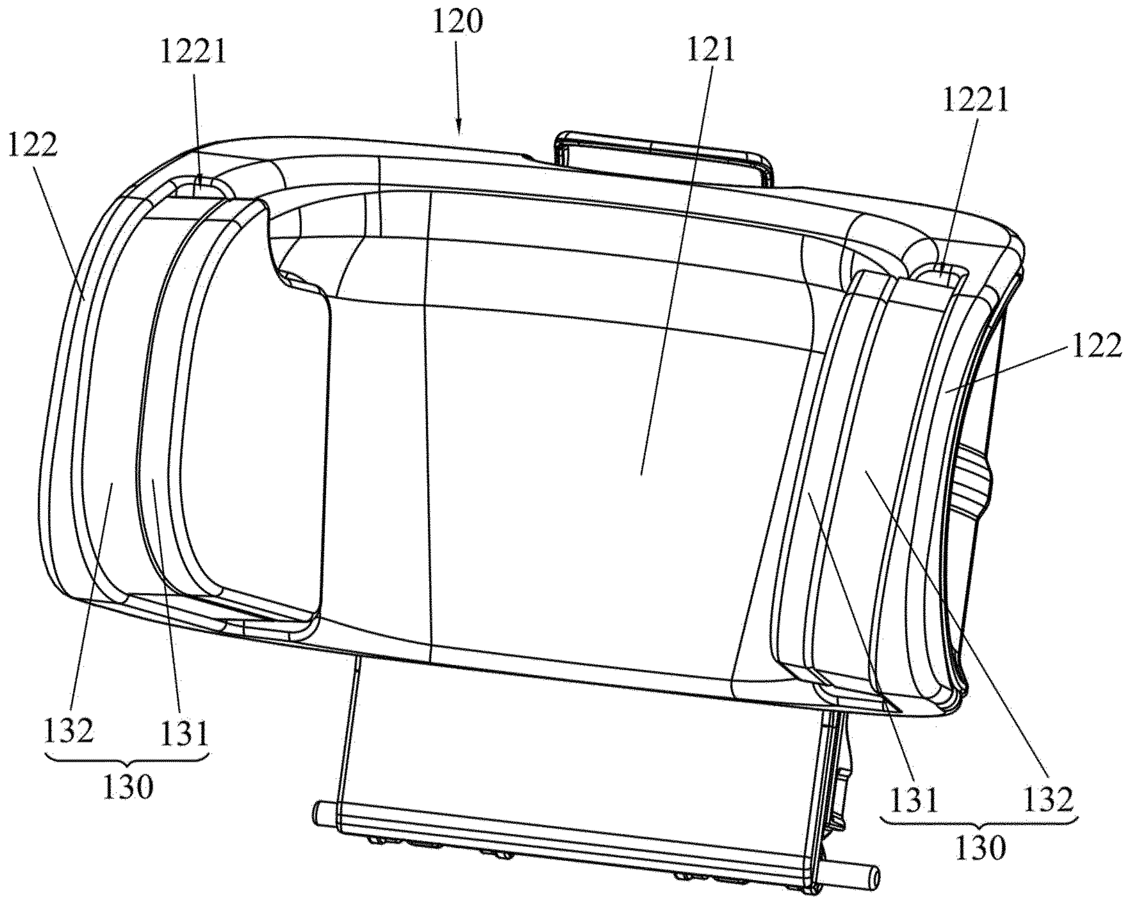
FIG. 2 is a structural schematic view of a headrest in FIG. 1 from another angle.

Referring to FIGS. 1-2, in a first embodiment of the present disclosure, the child safety seat 100 is only provided with a first buffer 130. The headrest 120 has a head supporting portion 121 and headrest side wings 122 connected to two opposite sides of the head supporting portion 121. The head supporting portion 121 and the two headrest side wings 122 are integrally formed into a substantially U-shaped structure, and the formed headrest 120 has a hard structure and a fixed shape, wherein the head supporting portion 121 is configured to support the neck and head of the infant, and the two headrest side wings 122 are configured to limit a lateral movement range of the head of the infant. The first buffer 130 is at least disposed along the inner side wall of any of the two headrest side wings 122.

With continued reference to FIGS. 1-2, in an implementation, two first buffers 130 are specifically provided. The two first buffers 130 are fixed on the inner side walls of the two headrest side wings 122 respectively. More specifically, the inner side wall of the headrest side wing 122 is concavely disposed outwards to form a fixing groove 1221. The shape of the first buffer 130 corresponds to that of the fixing groove 1221, and a thickness of the first buffer 130 corresponds to a depth of the fixing groove 1221. The first buffer 130 is attached or otherwise fixed to the fixing groove 1221, and a surface of the first buffer 130 forms a smooth transition with a surface of the head supporting portion 121, that is, the inner side wall of the headrest 120 is generally U-shaped and has a smooth transition, as shown in FIG. 2, so as to ensure the comfort of the head and neck of the infant.

It can be understood that the first buffer 130 is not limited to the arrangement of being fixed on the inner side walls of the two headrest side wings 122. For example, in other implementations, the child safety seat 100 may further include a headrest cover (not shown) sleeved outside the headrest 120. The first buffer 130 may be located inside the headrest cover and attached to the inner side wall of the headrest side wing 122. In addition, the first buffer 130 may be completely enclosed in the headrest cover or may be detachably located inside the headrest cover. As for the arrangement of the headrest cover, it is conventional in the art and will not be described in detail.

Figure 3:
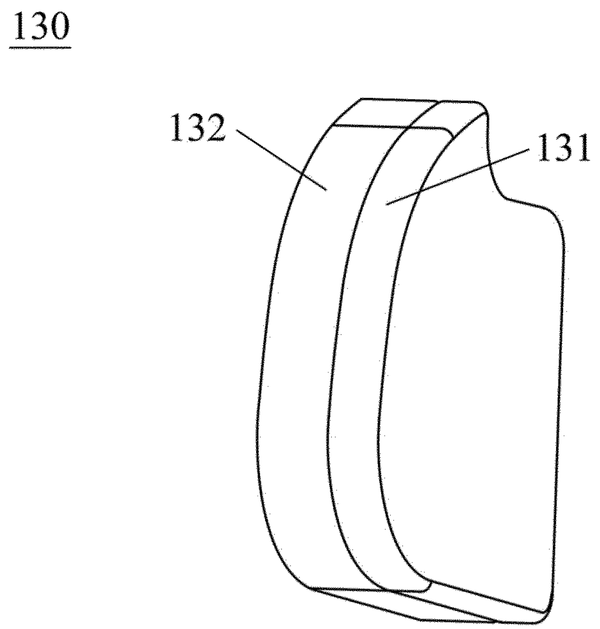
FIG. 3 is a structural schematic view of an implementation of a first buffer in the present disclosure.
Figure 4:
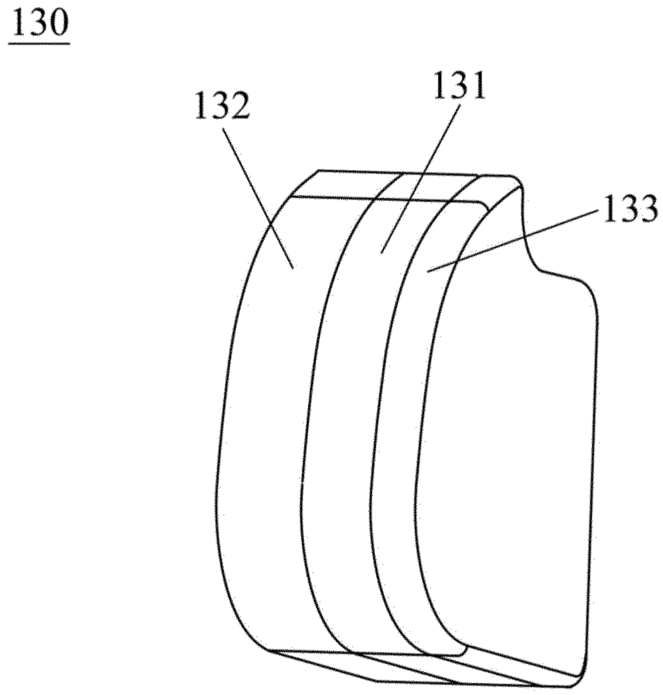
FIG. 4 is a structural schematic view of another implementation of the first buffer in the present disclosure.

Referring to FIGS. 2-4 below; in the implementation, the first buffer 130 includes at least one first buffer layer 131 and at least one second buffer layer 132. The first buffer layer 131 has certain hardness and certain thickness, shapes and sizes of the first buffer layer 131 and the second buffer layer 132 correspond to each other, and a hardness of the second buffer layer 132 is less than that of the first buffer layer 131. The second buffer layer 132 is fixed to a side of the first buffer layer 131. When the first buffer 130 is fixed to the headrest side wing 122, the second buffer layer 132 is fixed to the inner side wall of the headrest side wing 122, and the first buffer layer 131 is located on a side away from the inner side wall of the headrest 120. When in use, the first buffer layer 131 is close to the head of the infant. In this embodiment, the first buffer 130 is formed by combining the first buffer layer 131 and the second buffer layer 132 with different hardness, so that the first buffer 130 has better buffering performance, and can better protect the head and neck of the infant when subjected to impact force.

Referring to FIGS. 2-3, in the implementation, the first buffer 130 specifically includes a first buffer layer 131 and a second buffer layer 132, and the thickness of the first buffer layer 131 is slightly smaller than that of the second buffer layer 132. In an alternative implementation, the thickness of the first buffer layer 131 may be greater than or equal to the thickness of the second buffer layer 132.

Preferably, the first buffer layer 131 is integrally formed by an expanded material, and the thickness of the first buffer layer 131 is preferably 5 mm-25 mm. By forming the expanded material, the first buffer 130 has good buffering property and light weight, thereby reducing the weight of the whole buffer structure. Of course, the thickness of the first buffer layer 131 is not limited to the aforementioned thickness and may be flexibly adjusted according to specific requirements. Moreover, the first buffer layer 131 is not limited to being formed by an expanded material, but other materials with good buffering performance and light weight may also be used for forming.

In some implementations, the first buffer layer 131 is preferably integrally formed by any one of expandable polyethylene (EPE), expanded polypropylene (EPP), expanded polystyrene (EPS), expandable polyolefins (EPO), all of which have characteristics of good toughness, not easy to break and good buffering performance, so that the first buffer 130 has good buffering performance so as to have a good protective effect on the infant, and has light weight, greatly reducing the weight of the whole buffer structure, and thus reducing the weight of the child safety seat 100. Of course, the first buffer layer 131 is not limited to the materials listed above, but may be formed by other materials with good buffering performance and light weight.

In this implementation, the second buffer layer 132 is preferably a foam layer, and the thickness of the second buffer layer 132 is preferably 10 mm-40 mm. Of course, the second buffer layer 132 is not limited to be made of foam, but may be made of other similar materials, and the thickness of the second buffer layer 132 may be flexibly adjusted as required.

Referring to FIGS. 2 and 4 below; in a more preferred embodiment, the first buffer 130 further includes at least one third buffer layer 133, wherein a shape and a size of the third buffer layer 133 are corresponding to those of the first buffer layer 131, and a hardness of the third buffer layer 133 is less than that of the first buffer layer 131. The third buffer layer 133 is fixed on a side of the first buffer layer 131 away from the second buffer layer 132, that is, the first buffer layer 131 is sandwiched between the second buffer layer 132 and the third buffer layer 133. When the first buffer 130 having the three-layer structure is fixed on the headrest side wing 122, the second buffer layer 132 is fixed to the inner side wall of the headrest side wing 122, and the third buffer layer 133 is close to the head and neck of the infant. In this implementation, the third buffer layer 133 with smaller hardness is provided to make the head and neck of the infant more comfortable, and thus the thickness of the third buffer layer 133 is not particularly limited and can be flexibly determined as required.

Referring to FIGS. 5-8, a second embodiment of the present disclosure differs from the first embodiment in that the structure of the headrest 120 is slightly different and the position of the first buffer 130 is slightly different.

In this implementation, the headrest 120 also has a head supporting portion 121 and headrest side wings 122 connected to two opposite sides of the head supporting portion 121. However, the head supporting portion 121 and the two headrest side wings 122 are formed by directly filling flexible materials in the headrest cover, instead of maintaining a fixed shape after being integrally formed. Therefore, in a non-installed state, angles between the head supporting portion 121 and the two headrest side wings 122 are changeable. The headrest 120 with this structure has better comfort. For the headrest 120 in this implementation, the first buffer 130 is located inside the headrest side wing 122 and located close to the inner side wall, that is, the first buffer 130 is located close to the face of the infant, and the shape of the first buffer 130 is correspondingly adjusted according to the shape of the headrest side wing 122. Furthermore, the first buffer 130 may be directly sewn into the headrest side wing 122, that is, the first buffer 130 is not detachable: alternatively, an opening may be provided on the headrest cover so that the first buffer 130 is detachably located inside the headrest side wing 122.

In this embodiment, the specific structure and forming material of the first buffer 130 are the same as those in the first embodiment, and thus will not be repeated herein.

Figure 5:
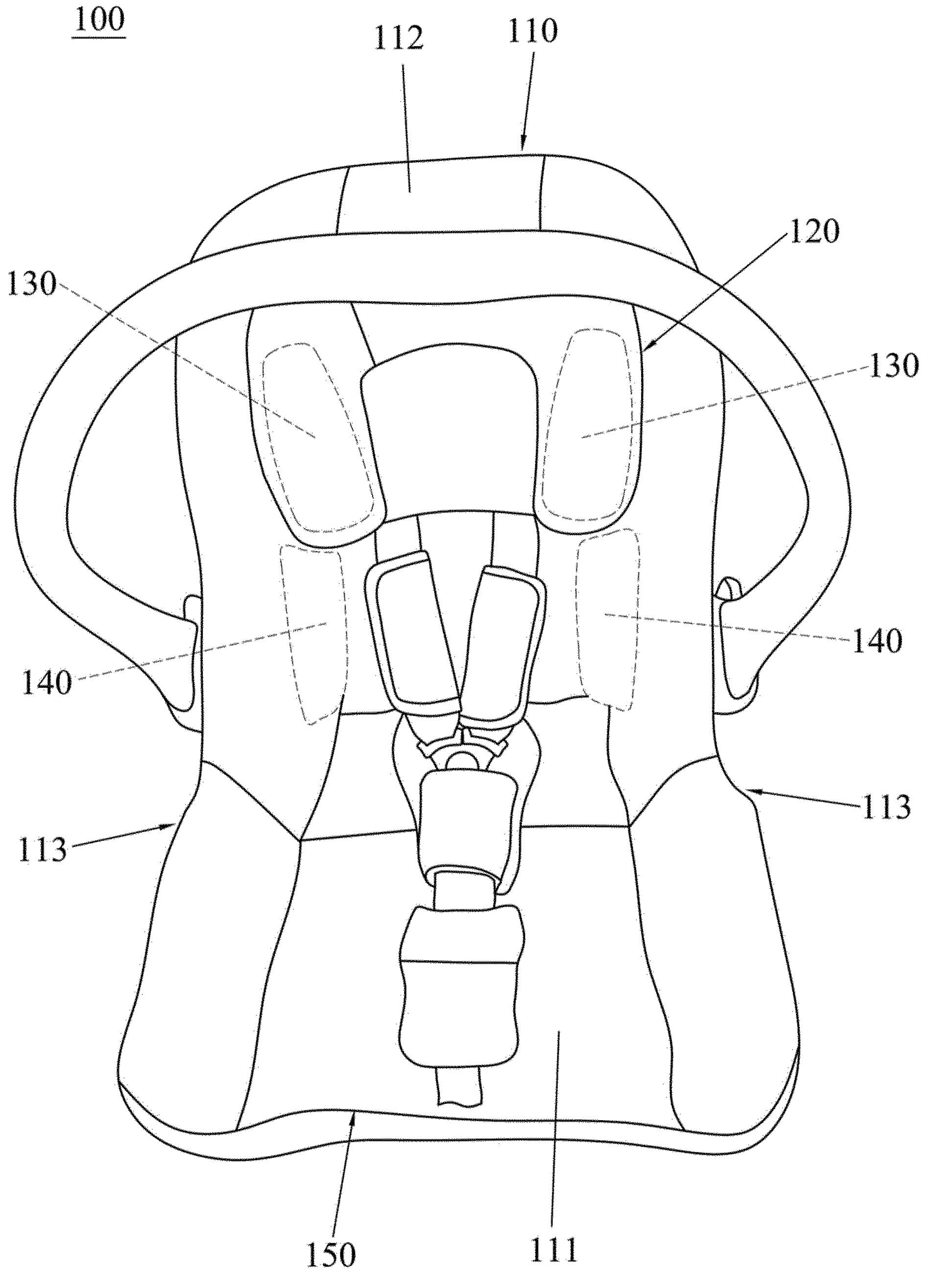
FIG. 5 is a structural schematic view of a child safety seat in a second embodiment of the present disclosure.
Figure 6:
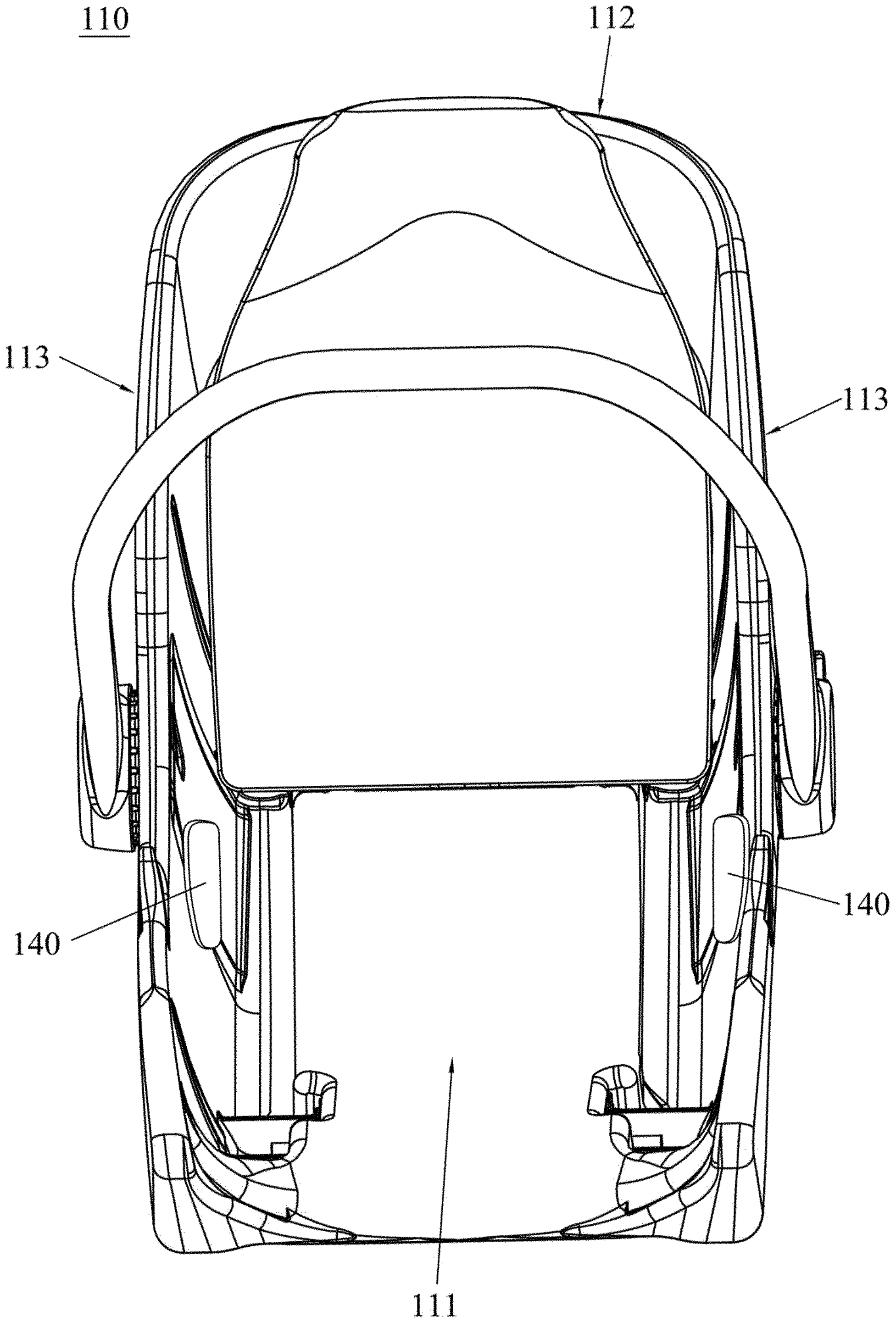
FIG. 6 is a structural schematic view of FIG. 5 with a cushion removed.
Figure 7:
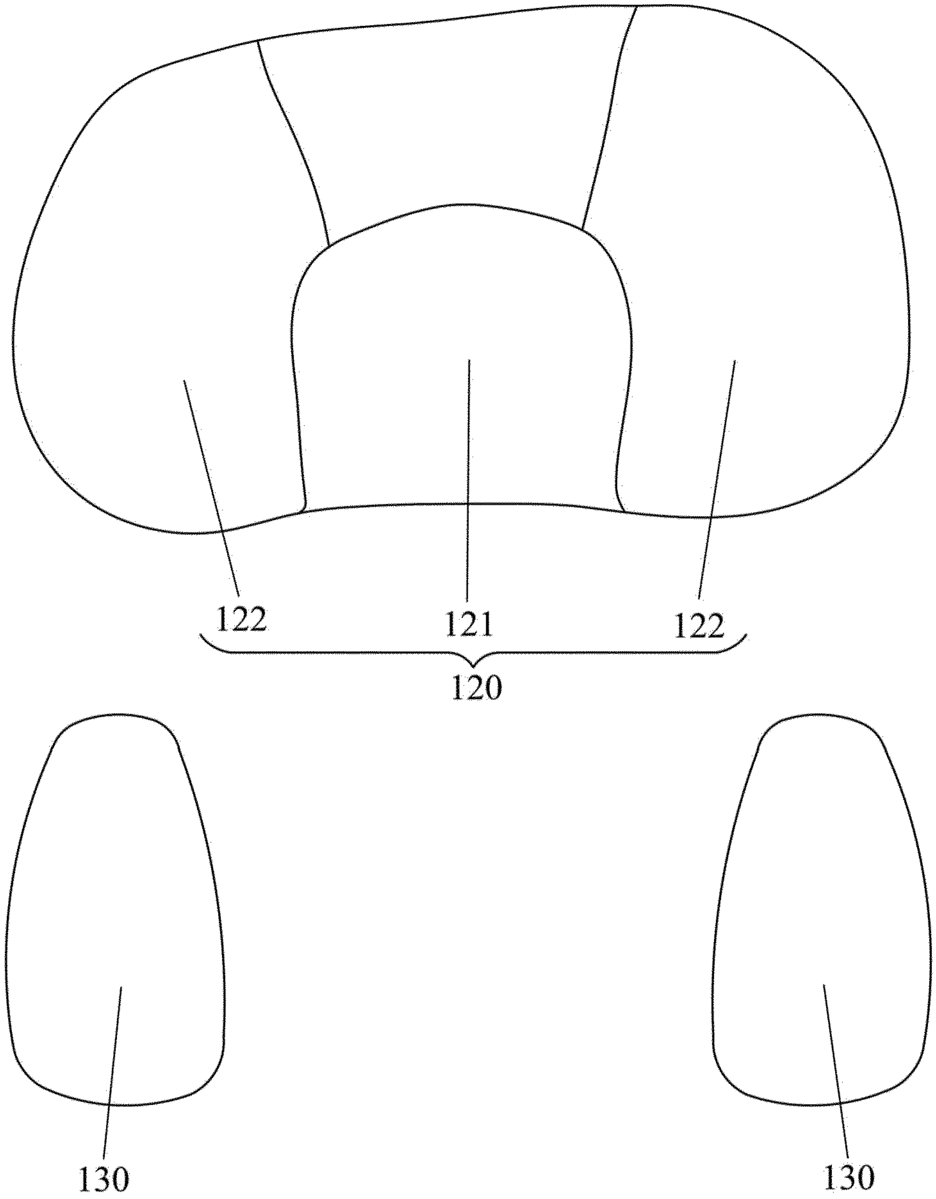
FIG. 7 is an exploded schematic view of a headrest in FIG. 5.
Figure 8:
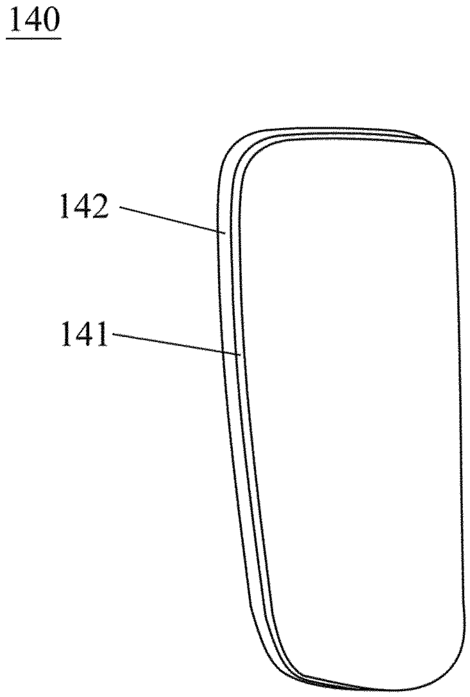
FIG. 8 is a structural schematic view of an implementation of a second buffer in FIG. 5.

As shown in FIGS. 5-6 and 8, in a second embodiment of the present disclosure, the child safety seat 100 is further provided with two second buffers 140, which are attached to the inner side walls of the seat side wings 113, respectively. In the height direction of the seat body 110, the second buffer 140 is fixed in an area between the headrest 120 and the seat portion 111 for protecting the shoulder of the infant sitting in the child safety seat 100. More specifically, the second buffer 140 is attached to or otherwise fixed to the inner side wall of the seat side wing 113, and the size and shape of the second buffer 140 may be flexibly set as required, which is not specifically limited herein.

As shown in FIG. 8, in this implementation, since the second buffer 140 is disposed at a position corresponding to the shoulder of the infant, the second buffer 140 may only be provided with a first buffer layer 141, and the first buffer layer 141 has certain hardness and certain thickness. The shape of the first buffer layer 141 is not specifically limited herein. The material and forming method of the first buffer layer 141 are the same as those of the first buffer layer 131 of the first buffer 130 in the first embodiment, and thus will not be repeated herein.

Further, the second buffer 140 may also be provided with a second buffer layer 142, wherein a hardness of the second buffer layer 142 is less than that of the first buffer layer 141, while a thickness of the second buffer layer 142 is slightly greater than that of the first buffer layer 141. The second buffer layer 142 is fixed on a side of the first buffer layer 141. After installation, the second buffer layer 142 is adjacent to the inner side wall of the seat side wing 113, so that the first buffer layer 141 is located at a side close to the shoulder of the infant. The material and forming method of the second buffer layer 142 are the same as those of the second buffer layer 132 of the first buffer 130, and thus will not be repeated herein.

Figure 13:
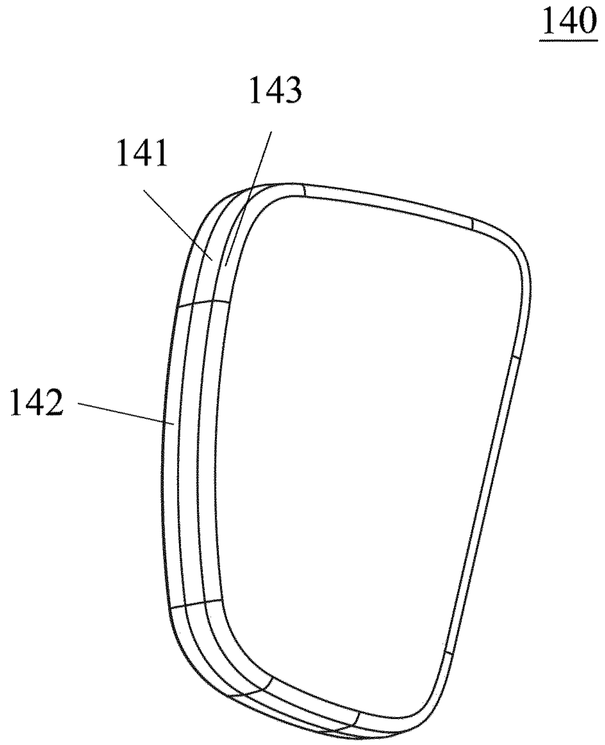
FIG. 13 is a structural schematic view of another implementation of the second buffer in FIG. 5.

Referring to FIG. 13, more preferably, the second buffer 140 may be further provided with a third buffer layer 143, and a hardness of the third buffer layer 143 is less than that of the first buffer layer 141. The third buffer layer 143 is fixed on a side of the first buffer layer 141 away from the second buffer layer 142, so that the first buffer layer 141 is sandwiched between the second buffer layer 142 and the third buffer layer 143. After installation, the third buffer layer 143 is close to the shoulder of the infant, and may provide a better comfort to the infant when sitting in the child safety seat 100. The material and forming method of the third buffer layer 143 are the same as those of the third buffer layer 133 in the first buffer 130, and thus will not be repeated herein.

The second buffer 140 may have various shapes such as square, rectangle, circle, ellipse, and irregular shape. An area of a surface of the second buffer 140 contacting with the side of the infant may be in a range of 4000 $mm^2$ to 20000 $mm^2$. The thickness of the second buffer 140 may be in a range of 10 mm to 40 mm. The second buffer 140 may be made of an expanded material such as EPS, EPO, and EPP.

With continued reference to FIGS. 5-6, in this implementation, the child safety seat 100 further includes a cushion 150 which is sleeved outside the seat body 110. The second buffer 140 may also be located inside the cushion 150 and attached to the inner side wall of the seat side wing 113, and may be enclosed in the cushion 150 or detachably located inside the cushion 150. The second buffer 140 may also be disposed in a pocket on an inner side of the cushion 150, and the inner side refers to a side of the cushion 150 facing towards the seat side wing 113. The pocket may be attached to the seat side wing 113 by means of a hook-loop fastener. The arrangement of the cushion 150 is conventional in the art and will not be described in detail.

It should be noted that the specific structure of the seat body 110 in this implementation is different from that in the above-mentioned first embodiment, however, both of them are conventional structures in the art, and will not affect the arrangement of the first buffer 130 and the second buffer 140.

Figure 9:
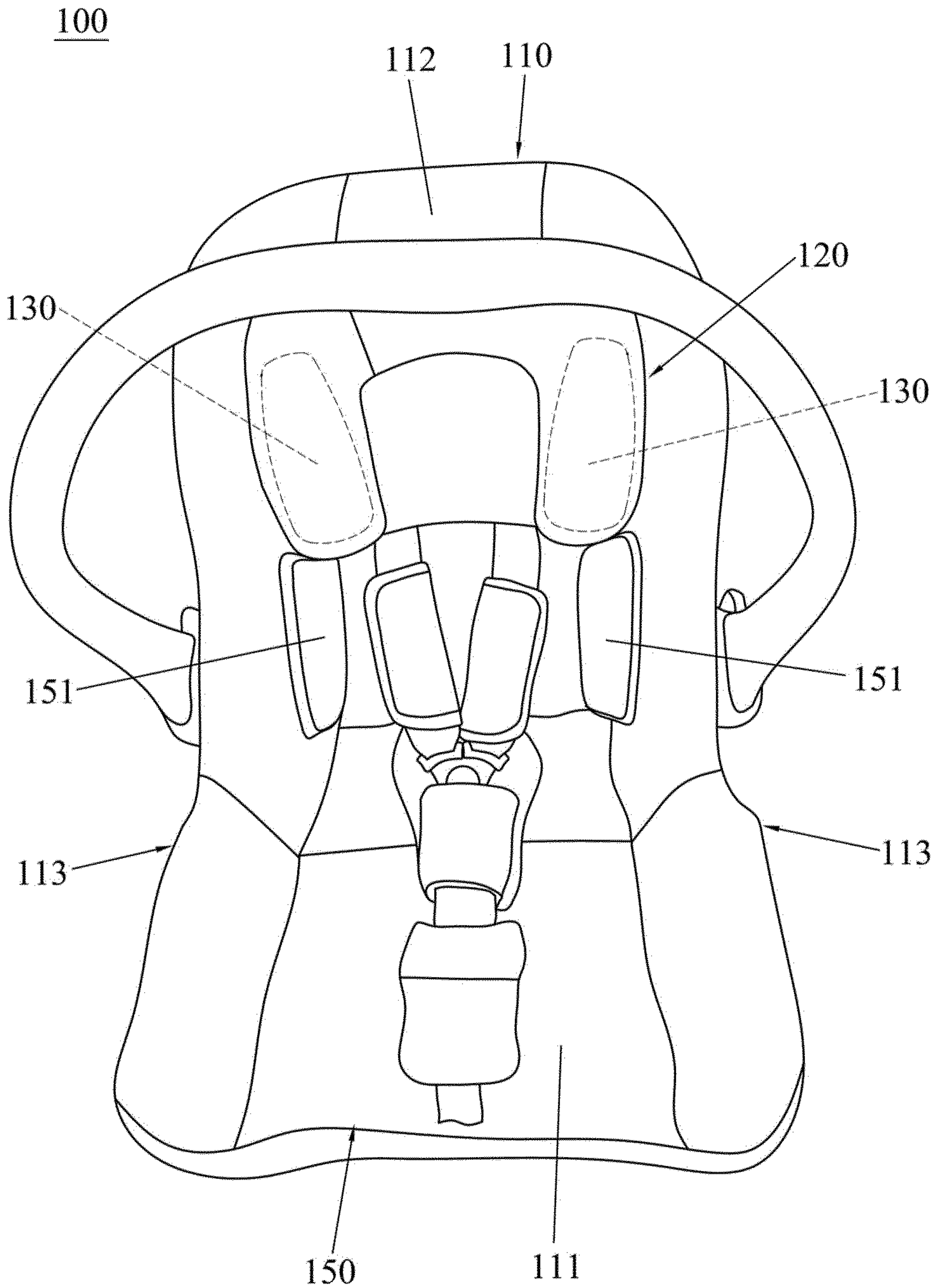
FIG. 9 is a structural schematic view of a child safety seat in a third embodiment of the present disclosure.
Figure 10:
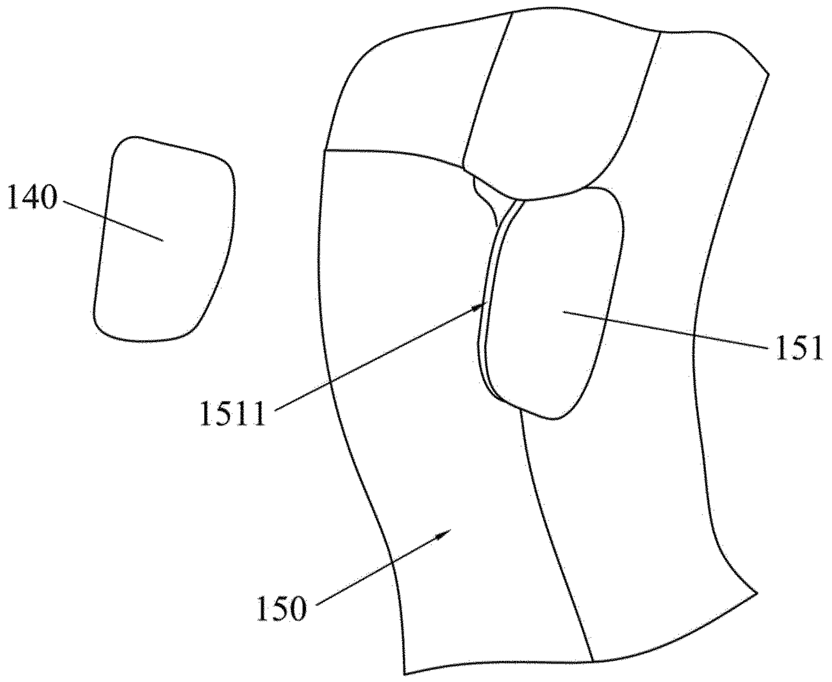
FIG. 10 is an enlarged schematic view of a pocket in FIG. 9.

Referring to FIGS. 9-10, a third embodiment of the present disclosure is different from the second embodiment only in that the arrangement position of the second buffer 140 is slightly different. Therefore, the same parts in these two embodiments will not be repeated herein.

In this implementation, the second buffer 140 is located inside the cushion 150 and attached to the inner side wall of the seat side wing 113, while in the height direction of the child safety seat 100, the second buffer 140 is still located between the headrest 120 and the seat portion 111, that is, the position of the second buffer 140 still corresponds to a position of the shoulder of the infant.

Referring to FIGS. 9-10, in this implementation, two opposite sides of the cushion 150 in a width direction are respectively provided with a pocket 151, and the two pockets 151 correspond to the inner side walls of the seat side wings 113 respectively. At the same time, in the height direction of the cushion 150, two pockets 151 each are located between the headrest 120 and the seat portion 111. The shape of the pocket 151 is set according to the shape and size of the second buffer 140. Each of the pockets 151 is preferably provided with an opening 1511 through which the second buffer 140 is put into the pocket 151 or removed from the pocket 151. The opening 1511 is disposed at a front side or a lower side of the pocket 151. In this implementation, the second buffer 140 is disposed as a detachable structure to facilitate the disassembly and cleaning of the cushion 150. Of course, the buffering function of the present disclosure may also be realized by placing the second buffer 140 in the pocket 151 and completely closing the pocket 151. The pocket 151 is detachably or non-detachably connected to the cushion 150. The pocket 151 is detachably connected to the cushion 150, by for example, a hook-loop fastener.

Figure 11:
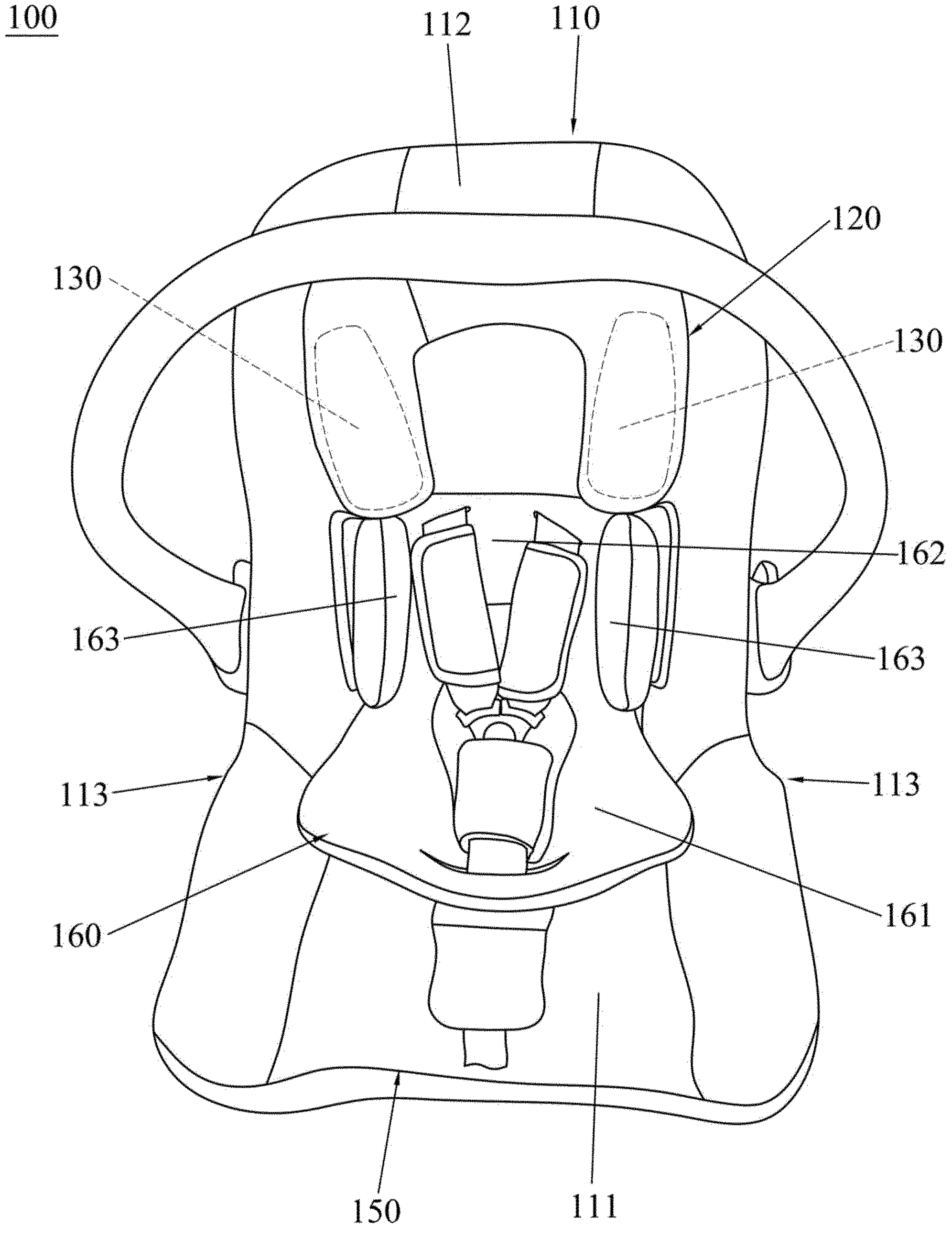
FIG. 11 is a structural schematic view of a child safety seat in a fourth embodiment of the present disclosure.
Figure 12:
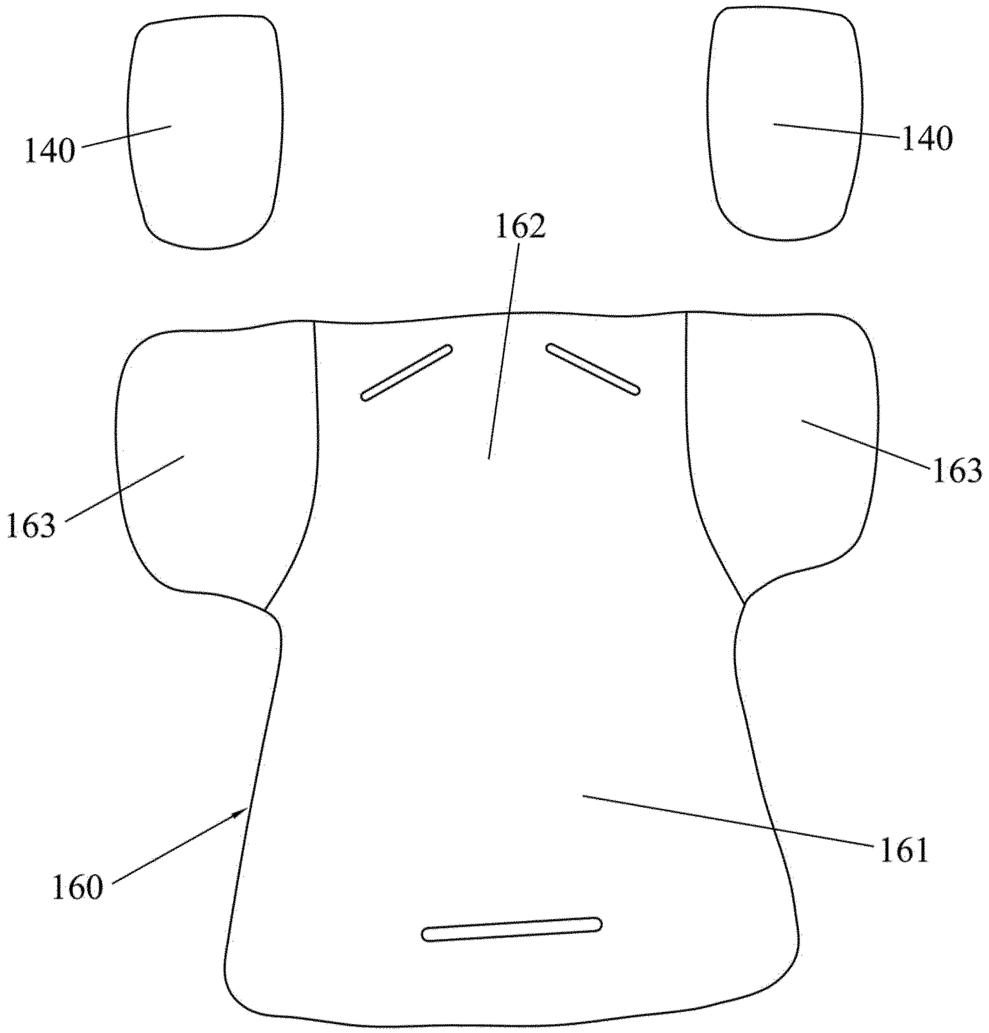
FIG. 12 is an exploded schematic view of a small cushion in FIG. 11.

Referring to FIGS. 11-12, a fourth embodiment of the present disclosure differs from the third embodiment only in that the second buffer 140 is disposed in a slightly different way; wherein the first buffer 130 may be disposed in any of the above-mentioned ways.

In this implementation, the child safety seat 100 further includes a small cushion 160, which is installed on the cushion 150 and located below the headrest 120 in the height direction of the child safety seat 100. Specifically, the small cushion 160 has a hip supporting portion 161, a back supporting portion 162 and two shoulder supporting portions 163. The back supporting portion 162 is disposed above the hip supporting portion 161, and both of the back supporting portion and the hip supporting portion are preferably formed as an integrated structure, which is not limited thereto. The two shoulder supporting portions 163 are symmetrically disposed on both sides of the back supporting portion 162. When the small cushion 160 is installed, the hip supporting portion 161 is located above the seat portion 111, the back supporting portion 162 is attached to the backrest portion 112 and located below the headrest 120, and the two shoulder supporting portions 163 are attached to the inner side walls of the two seat side wings 113 respectively. The shoulder supporting portions 163 are used for supporting and restraining the shoulder of the infant, as shown in FIG. 11.

In this implementation, the second buffer 140 is located inside the shoulder supporting portion 163, and the second buffer 140 may be directly sewn into the shoulder supporting portion 163. Alternatively; the shoulder supporting portion 163 is provided with an opening, so that the second buffer 14 is detachable. Furthermore, the shape of the second buffer 140 may be flexibly set according to the shape of the shoulder supporting portion 163, as long as it can be fitted into the shoulder supporting portion 163.

It can be understood that, in this implementation, the second buffer 140 is not only provided on the shoulder supporting portion 163 of the small cushion 160, but also on both sides of the cushion 150, and/or the second buffer 140 may be provided on the inner side wall of the seat body 110, that is, the second buffer 140 is provided on at least one of: the shoulder supporting portion 163 of the small cushion 160, both sides of the cushion 150 and the inner side wall of the seat body 110.

Referring to FIGS. 5-12 again, in the second to fourth embodiments of the present disclosure, the specific shapes and sizes of the first buffer 130 and the second buffer 140 are flexibly and adaptively changed according to their installation positions.

Figure 14:
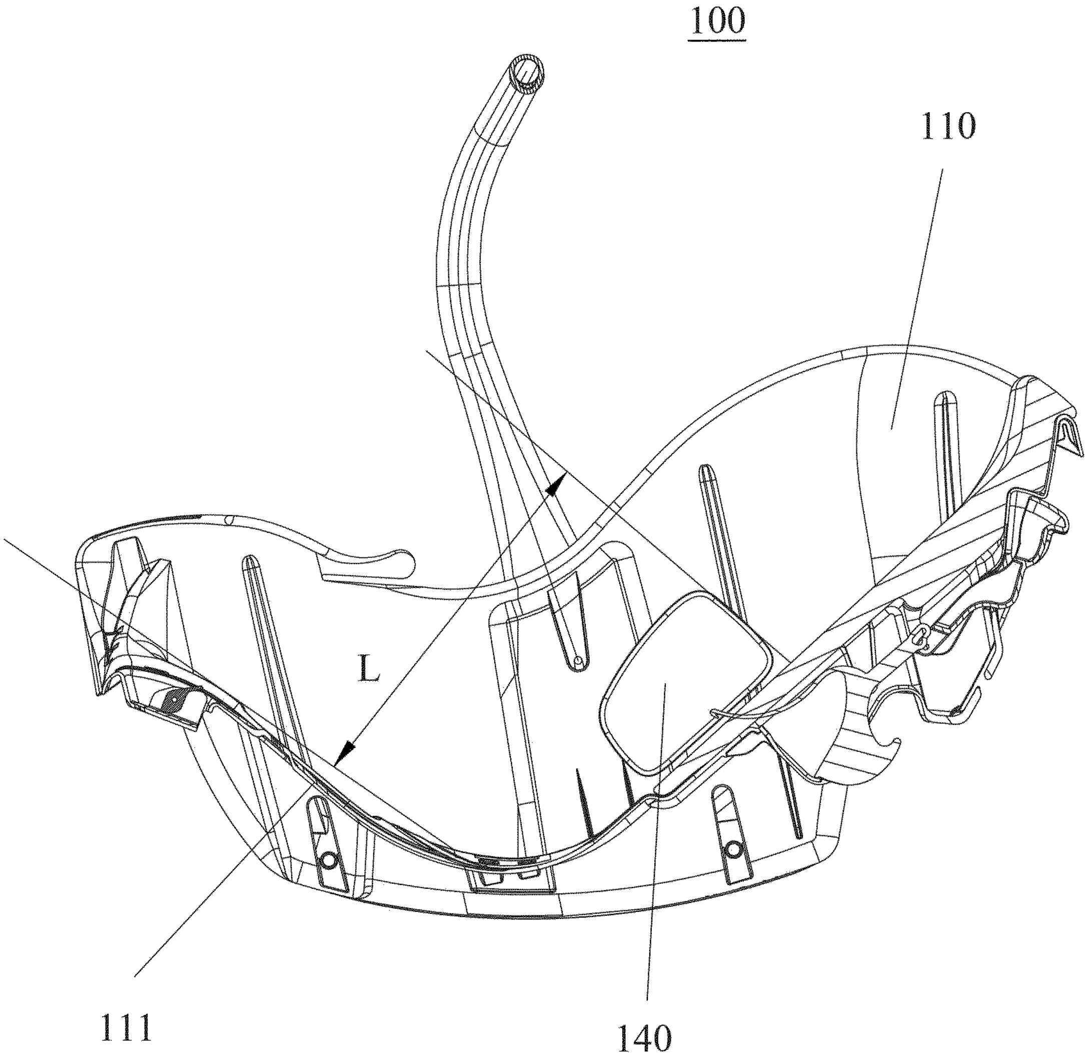
FIG. 14 is a structural schematic view of a child safety seat in an embodiment of the present disclosure.

Referring to FIG. 14, in order to enable the height of the second buffer 140 to better adapt to the shoulder of the infant, a distance L from an upper edge of the second buffer 140 to the seat portion 111 is in a range of 200 mm to 400 mm. The second buffer 140 protrudes from an inner surface of the seat body 110, so that the shoulder of the infant will contact the second buffer 140 before contacting the seat body 110, thereby ensuring that the second buffer 140 can function a buffering effect.

In conclusion, the child safety seat 100 of the present disclosure is only provided with the first buffer 130 along the inner side wall of the headrest 120 without other buffer structures provided at other positions of the seat body 110. Therefore, on the premise of omitting most of buffer structures compared with the prior art, the child safety seat 100 can still have a good protective effect on the infant, and reduce the weight of the whole buffer structure, thereby simultaneously reducing the weight and manufacturing cost of the child safety seat 100. In addition, the first buffer 130 is formed of the first buffer layer 131 and the second buffer layer 132 with different hardness, so that on the premise of ensuring better buffering performance, the child safety seat of the present disclosure has better comfort, simple structure and easier production and manufacturing, thus further saving the cost of the child safety seat 100 and its buffer structure.

Figure 15:
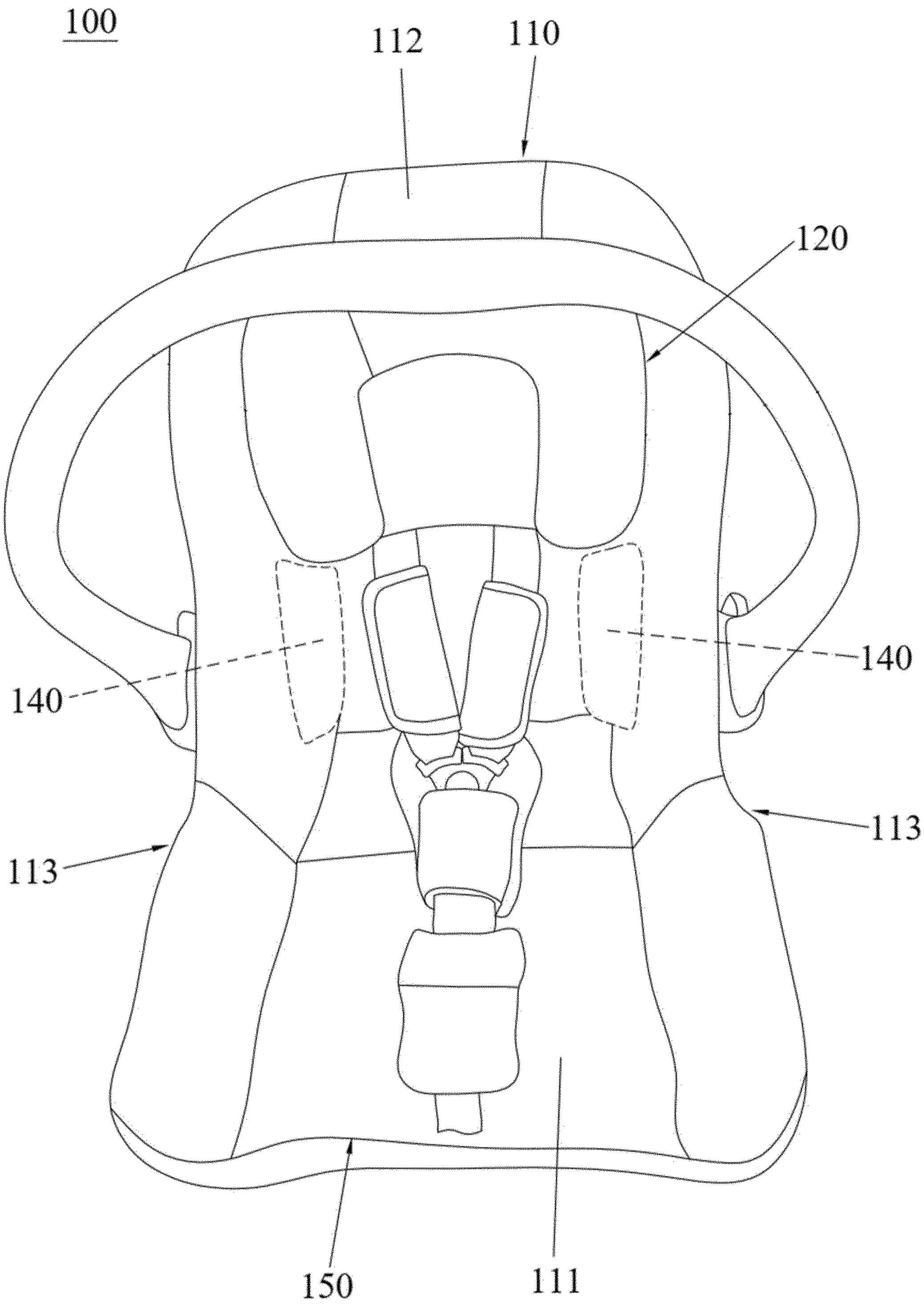
FIG. 15 is a structural schematic view of a child safety seat in a fifth embodiment of the present disclosure.

Referring to FIG. 15, a fifth embodiment of the present disclosure is different from the above-mentioned second embodiment in that, the headrest 120 does not have the first buffer 130.

In this embodiment, the child safety seat 100 may have a headrest 120. The headrest 120 may be solid filled.

Referring to FIGS. 15 and 6, the child safety seat 100 is further provided with a second buffer 140. The child safety seat 100 further includes a cushion 150 sleeved outside the seat body 110, the second buffer 140 is located inside the cushion 150 and attached to the inner side wall of the seat side wing 113, and the second buffer 140 is enclosed within cushion 150 or detachably located inside the cushion 150. The second buffer 140 may also be disposed in a pocket on an inner side of the cushion 150, and the inner side refers to a side of the cushion 150 facing towards the seat side wing 113. The pocket accommodating the second buffer 140 is set to be openable, so that the second buffer 140 may be taken out from the pocket. Alternatively, the pocket accommodating the second buffer 140 is configured to be sealed so that the second buffer 140 cannot be removed from the pocket.

Referring to FIG. 6, the second buffer 140 is disposed to attach to the inner side wall of the seat side wing 113. In the height direction of the seat body 110, the second buffer 140 is fixed in the area between the headrest 120 and the seat portion 111 for protecting the shoulder of the infant sitting in the child safety seat 100. The pocket 151 (see FIG. 10) is attached to the seat side wing 113 by means of a hook-loop fastener. More specifically, the second buffer 140 is attached to or fixed to the inner side wall of the seat side wing 113 by other means, and the size and shape of the second buffer 140 may be flexibly set as required, which is not specifically limited herein.

Referring to FIG. 8, in this embodiment, the second buffer 140 is disposed at a position corresponding to the shoulder of the infant, so that the second buffer 140 may only be provided with the first buffer layer 141, wherein the first buffer layer 141 has certain hardness and certain thickness, and its shape is not specifically limited herein. The material and forming method of the first buffer layer 141 may be the same as those of the first buffer layer 131 of the first buffer 130 in the above-mentioned first embodiment, and thus will not be repeated herein.

Further, the second buffer 140 is provided with a second buffer layer 142. The hardness of the second buffer layer 142 is less than that of the first buffer layer 141, but the thickness of the second buffer layer 142 is slightly greater than that of the first buffer layer 141. The second buffer layer 142 is fixed on a side of the first buffer layer 141. After installation, the second buffer layer 142 is adjacent to the inner side wall of the seat side wing 113, so that the first buffer layer 141 is close to a side of the shoulder of the infant. The material and forming method of the second buffer layer 142 are also the same as those of the second buffer layer 132 of the first buffer 130 in the above-mentioned embodiment, and thus will not be described again.

Referring to FIG. 13, more preferably, the second buffer 140 may further be provided with a third buffer layer 143 having a hardness less than the hardness of the first buffer layer 141. The third buffer layer 143 is fixed on a side of the first buffer layer 141 away from the second buffer layer 142, so that the first buffer layer 141 is sandwiched between the second buffer layer 142 and the third buffer layer 143. After installation, the third buffer layer 143 is close to the shoulder of the infant, and the third buffer layer 143 may provide better comfort for the infant when sitting in the child safety seat 100. The material and forming method of the third buffer layer 143 are also the same as those of the third buffer layer 133 of the first buffer 130 in the above-mentioned embodiment, and will not be repeated herein.

The second buffer 140 may have various shapes such as square, rectangle, circle, ellipse, and irregular shape. An area of a surface of the second buffer 140 contacting with the side of the infant may be in a range of 4000 $mm^2$ to 20000 $mm^2$. The thickness of the second buffer 140 may be in a range of 10 mm to 40 mm. The second buffer 140 may be made of an expanded material such as EPS, EPO, and EPP.

Figure 16:
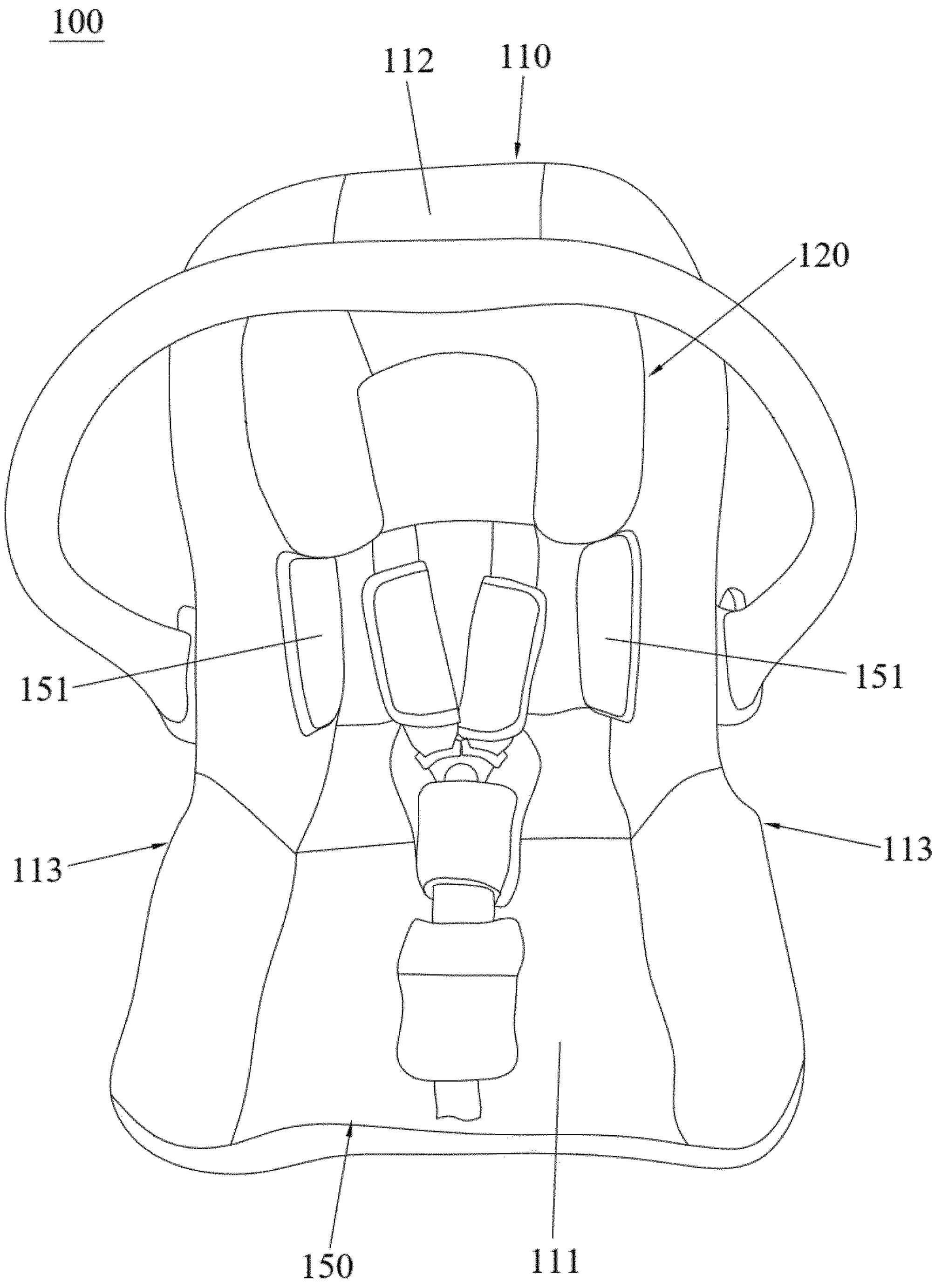
FIG. 16 is a structural schematic view of a child safety seat in a sixth embodiment of the present disclosure.

Referring to FIGS. 16 and 10 below; a sixth embodiment of the present disclosure is different from the third embodiment in that, the headrest 120 does not have the first buffer member 130.

In this embodiment, the second buffer 140 is located inside the cushion 150 and is attached to the inner side wall of the seat side wing 113, but in the height direction of the child safety seat 100, the second buffer 140 is still located between the headrest 120 and the seat portion 111, that is, the position of the second buffer 140 still corresponds to the position of the shoulder of the infant.

Referring to FIGS. 16 and 10, in this implementation, two opposite sides of the cushion 150 in the width direction may each be provided with a pocket 151, and two pockets 151 correspond to the inner side walls of the seat side wings 113 respectively. In the height direction of the cushion 150, the two pockets 151 each are located between the headrest 120 and the seat portion 111. The shape of the pockets 151 is set according to the shape and size of the second buffer 140, and each of the pockets 151 preferably has an opening 1511. The second buffer 140 is put into the pocket 151 or removed from the pocket 151 through the opening 1511. The opening 1511 may be provided on the front side or the lower side of the pocket 151. In this implementation, the second buffer 140 is configured as a detachable structure, so as to facilitate the disassembly and cleaning of the cushion 150. Of course, in case that the second buffer 140 is located inside the pocket 151 and the pocket 151 is completely closed, the buffering function of the present disclosure may also be achieved. The pocket 151 may be detachably or non-detachably connected to the cushion 150. The pocket 151 may be detachably connected to the cushion 150 by means of a hook-loop fastener.

Figure 17:
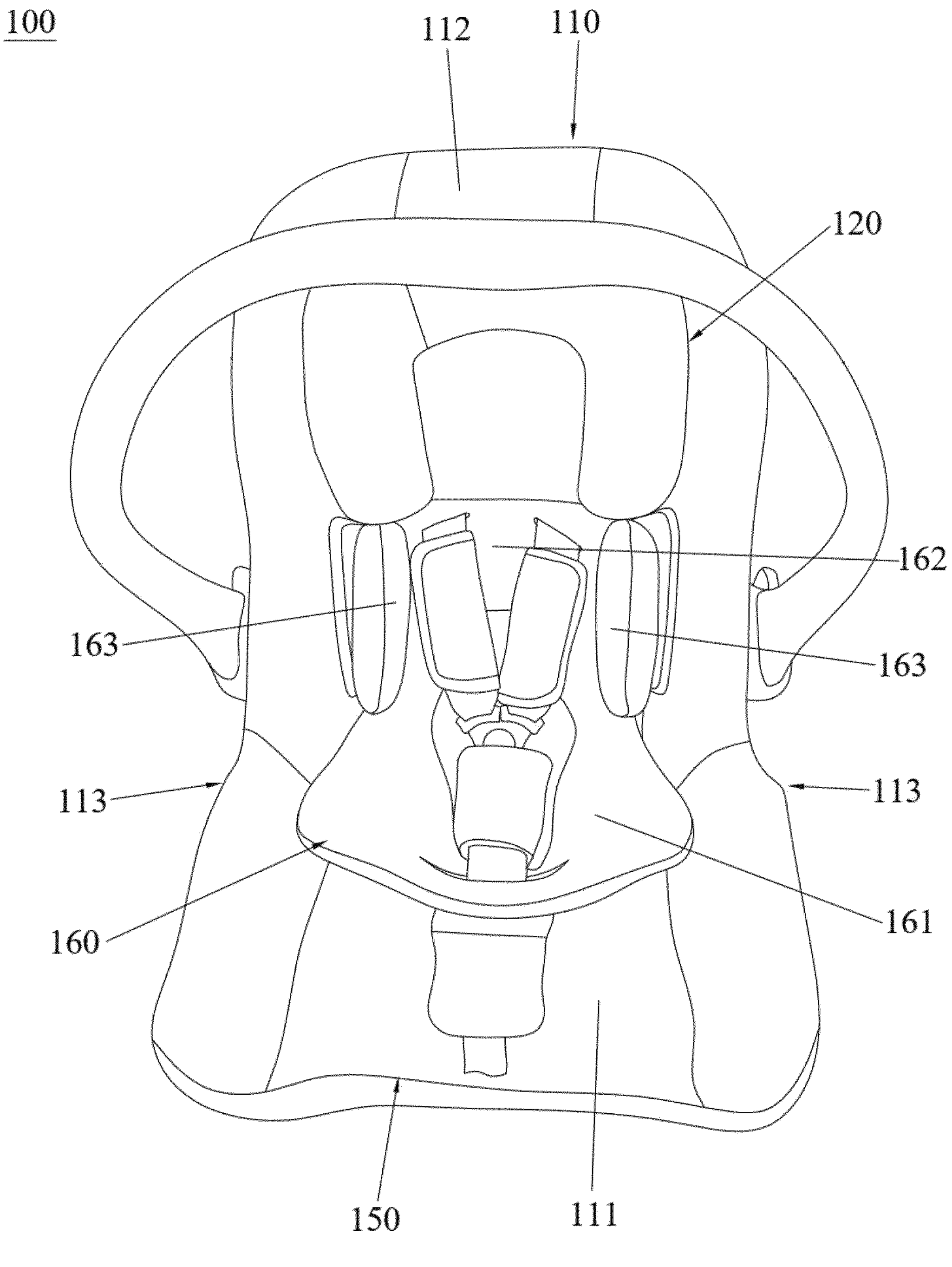
FIG. 17 is a structural schematic view of a child safety seat in a seventh embodiment of the present disclosure.

Referring to FIGS. 17 and 12, a seventh embodiment of the present disclosure is different from the above-mentioned fourth embodiment only in that, the headrest 120 does not have the first buffer 130.

In this embodiment, the child safety seat 100 further includes a small cushion 160 installed on the cushion 150, and in the height direction of the child safety seat 100, the small cushion 160 is located below the headrest 120. Specifically, the small cushion 160 has a hip supporting portion 161, a back supporting portion 162 and two shoulder supporting portions 163. The back supporting portion 162 is disposed above the hip supporting portion 161, and both of the back supporting portion and the hip supporting portion are preferably formed as an integrated structure, which is not limited thereto. The two shoulder supporting portions 163 are symmetrically disposed on both sides of the back supporting portion 162. When the small cushion 160 is installed, the hip supporting portion 161 is located above the seat portion 111, the back supporting portion 162 is attached to the backrest portion 112 and located below the headrest 120, and the two shoulder supporting portions 163 are attached to the inner side walls of the two seat side wings 113 respectively. The shoulder supporting portions 163 are configured to support and restrain the shoulder of the infant, as shown in FIG. 17.

In this implementation, the second buffer 140 is located inside the shoulder supporting portion 163, and the second buffer 140 may be directly sewn into the shoulder supporting portion 163. Alternatively, the shoulder supporting portion 163 is provided with an opening, so that the second buffer 140 is detachable. Furthermore, the shape of the second buffer 140 may be flexibly set according to the shape of the shoulder supporting portion 163, as long as it can be fitted into the shoulder supporting portion 163.

It can be understood that, in this implementation, the second buffer 140 is not only provided on the shoulder supporting portion 163 of the small cushion 160, but also on both sides of the cushion 150, and/or the second buffer 140 may be provided on the inner side wall of the seat body 110, that is, the second buffer 140 is provided on at least one of: the shoulder supporting portion 163 of the small cushion 160, both sides of the cushion 150 and the inner side wall of the seat body 110.

Referring to FIGS. 15-17 again, in the fifth to seventh embodiments of the present disclosure, the specific shape and size of the second buffer 140 may be flexibly and adaptively changed according to their installation positions. Referring to FIG. 14, in order to enable the height of the second buffer 140 to better adapt to the shoulder of the infant, a distance L from an upper edge of the second buffer 140 to the seat portion 111 is in a range of 200 mm to 400 mm. The second buffer 140 protrudes from an inner surface of the seat body 110, so that the shoulder of the infant will contact the second buffer 140 before contacting the seat body 110, thereby ensuring that the second buffer 140 can function a buffering effect.

In conclusion, the child safety seats 100 in the fifth to seventh embodiments of the present disclosure are only provided with the buffering structure at the position of the shoulder of the infant, without other buffer structures provided at other positions of the seat body 110. Therefore, on the premise of omitting most of buffer structures compared with the prior art, the child safety seat 100 can still have a good protective effect on the infant, and reduce the weight of the whole buffer structure, thereby simultaneously reducing the weight and manufacturing cost of the child safety seat 100. In addition, the second buffer 140 is formed of the first buffer layer 141 and the second buffer layer 142 with different hardness, so that on the premise of ensuring better buffering performance, the child safety seat of the present disclosure has better comfort, simple structure and easier production and manufacturing, thus further saving the cost of the child safety seat 100 and its buffer structure.

The structures of other parts of the child safety seat 100 of the present disclosure are conventional arrangements well known to those of ordinary skill in the art, and will not be described in detail herein.

What has been disclosed above is only the preferred embodiment of the present disclosure, which of course should not be intended to limit the scope of claims of the present disclosure. Therefore, equivalent changes made according to the scope of the present disclosure are still covered by the present disclosure.

What is claimed is:

1. A child safety seat comprising:

a seat body having two seat side wings, the two seat side wings being oppositely disposed with respect to each other;

a headrest installed on the seat body;

a first buffer disposed along an inner side wall of the headrest; and a second buffer disposed along an inner side wall of one of the two seat side wings and located below the headrest, wherein the first buffer comprises at least one first buffer layer and at least one second buffer layer, wherein a hardness of the second buffer layer is less than that of the first buffer layer, and wherein the second buffer layer is fixed on a side of the first buffer layer and adjacent to the inner side wall of the headrest, and the first buffer layer is located at a side away from the inner side wall of the headrest.

2. The child safety seat according to claim 1, wherein the headrest has two headrest side wings, the two headrest side wings being oppositely disposed with respect to each other, and the first buffer is disposed at least along an inner side wall of one of the two headrest side wings.

3. The child safety seat according to claim 2, wherein the child safety seat further comprises a headrest cover sleeved outside the headrest, the first buffer is fixed on the inner side wall of one of the headrest side wings or located inside the headrest cover and attached to the inner side wall of one of the headrest side wings.

4. The child safety seat according to claim 2, wherein the inner side wall of one of the headrest side wings is concavely provided with a fixing groove, the first buffer is accommodated in the fixing groove, and a surface of the first buffer layer forms a smooth transition with the inner side wall of the headrest.

5. The child safety seat according to claim 1, wherein the seat body further comprises a seat portion and a backrest portion disposed above the seat portion, each of the seat side wings extends along an up-down direction of the seat body and is connected to the seat portion and the backrest portion, the headrest is installed on the backrest portion, and the second buffer is disposed in an area between the headrest and the seat portion in a height direction of the seat body.

6. The child safety seat according to claim 1, further comprising a cushion sleeved outside the seat body, and the second buffer is fixed on the inner side wall of one of the seat side wings or located inside the cushion and attached to the inner side wall of one of the seat side wings.

7. The child safety seat according to claim 6, wherein the cushion is provided with two pockets at positions corresponding to the inner side walls of the two seat side wings, the two pockets are symmetrically disposed below the headrest, and the second buffer is located inside one of the pockets.

8. The child safety seat according to claim 7, wherein each of the pockets has an opening, and the second buffer is detachably located inside one of the pockets through the opening.

9. The child safety seat according to claim 1, further comprising a small cushion disposed on the seat body, wherein the small cushion has two shoulder supporting portions, the two shoulder supporting portions being oppositely disposed with respect to each other, the two shoulder supporting portions are attached to the inner side walls of the two seat side wings respectively, and the second buffer is located inside one of the shoulder supporting portions.

10. The child safety seat according to claim 1, wherein the second buffer comprises at least one first buffer layer.

11. The child safety seat according to claim 10, wherein the first buffer layer of the second buffer is integrally formed by an expanded material, and a thickness of the first buffer layer of the second buffer is 5 mm to 25 mm.

12. The child safety seat according to claim 10, wherein the first buffer layer of the second buffer is integrally formed by any one of expandable polyethylene, expanded polypropylene, expanded polystyrene, and expandable polyolefins.

13. The child safety seat according to claim 10, wherein the second buffer further comprises at least one second buffer layer fixed on a side of the first buffer layer of the second buffer and adjacent to the inner side wall of one of the seat side wings, and the first buffer layer of the second buffer is located on a side away from the inner side wall of the seat side wing.

14. The child safety seat according to claim 13, wherein the second buffer further comprises at least one third buffer layer, a hardness of the third buffer layer is less than that of the first buffer layer, and the third buffer layer is fixed on a side of the first buffer layer away from the second buffer layer.

15. The child safety seat according to claim 14, wherein the second buffer layer and the third buffer layer are both foam layers, and a thickness of the second buffer layer is 10 mm to 40 mm.

16. The child safety seat according to claim 1, wherein the first buffer layer of the first buffer is integrally formed by an expanded material, and a thickness of the first buffer layer of the first buffer is 5 mm to 25 mm.

17. The child safety seat according to claim 1, the first buffer layer of the first buffer is integrally formed by any one of expandable polyethylene, expanded polypropylene, expanded polystyrene, and expandable polyolefins.

18. The child safety seat according to claim 1, wherein the first buffer further comprises at least one third buffer layer, a hardness of the third buffer layer is less than that of the first buffer layer, and the third buffer layer is fixed on a side of the first buffer layer away from the second buffer layer.

19. The child safety seat according to claim 18, wherein the second buffer layer and the third buffer layer are both foam layers, and a thickness of the second buffer layer is 10 mm to 40 mm.

20. A child safety seat comprising:

a seat body having two seat side wings, the two seat side wings being oppositely disposed with respect to each other;

a headrest installed on the seat body;

a buffer disposed along an inner side wall of one of the two seat side wings and located below the headrest; and a cushion sleeved outside the seat body, wherein the buffer is fixed on the inner side wall of one of the seat side wings or located inside the cushion and attached to the inner side wall of one of the seat side wings.

21. The child safety seat according to claim 20, wherein the seat body further comprises a seat portion and a backrest portion disposed above the seat portion, each of the seat side wings extends along an up-down direction of the seat body and is connected to the seat portion and the backrest portion, the headrest is installed on the backrest portion, and the buffer is disposed in an area between the headrest and the seat portion in a height direction of the seat body.

22. The child safety seat according to claim 21, wherein a distance from an upper edge of the buffer to the seat portion is 200 mm to 400 mm, and an area of a surface of the buffer contacting with a side of an infant is 4000 $mm^2$ to 20000 $mm^2$.

23. The child safety seat according to claim 20, wherein the cushion is provided with two pockets at positions corresponding to the inner side walls of the seat side wings, the two pockets are symmetrically disposed below the headrest, and the buffer is located inside one of the pockets.

24. The child safety seat according to claim 23, wherein each of the pockets has an opening, and the buffer is detachably located inside one of the pockets through the opening.

25. The child safety seat according to claim 20, further comprising a small cushion disposed on the seat body, wherein the small cushion has two shoulder supporting portions, the two shoulder supporting portions being oppositely disposed with respect to each other, the two shoulder supporting portions are attached to the inner side walls of the two seat side wings respectively, and the buffer is located inside one of the shoulder supporting portions.

26. The child safety seat according to claim 20, further comprising a cushion sleeved outside the seat body, wherein the cushion is provided with two pockets at positions corresponding to the inner side walls of the seat side wings, the two pockets are symmetrically disposed below the headrest, and the buffer is located inside one of the pockets.

27. The child safety seat according to claim 20, wherein the buffer comprises at least one first buffer layer.

28. The child safety seat according to claim 27, wherein the first buffer layer is integrally formed by an expanded material, and a thickness of the first buffer layer is 5 mm to 25 mm.

29. The child safety seat according to claim 27, wherein the first buffer layer is integrally formed by any one of expandable polyethylene, expanded polypropylene, expanded polystyrene, and expandable polyolefins.

30. The child safety seat according to claim 20, wherein the buffer is connected to one of the seat side wings by a hook-loop fastener.

31. A child safety seat comprising:

a seat body having two seat side wings, the two seat side wings being oppositely disposed with respect to each other;

a headrest installed on the seat body; and a buffer disposed along an inner side wall of one of the two seat side wings and located below the headrest, wherein the buffer comprises at least one first buffer layer, and wherein the buffer further comprises at least one second buffer layer fixed on a side of the first buffer layer and adjacent to the inner side wall of one of the seat side wings, and the first buffer layer is located on a side away from the inner side wall of the seat side wing.

32. The child safety seat according to claim 31, wherein the buffer further comprises at least one third buffer layer, a hardness of the third buffer layer is less than that of the first buffer layer, and the third buffer layer is fixed on a side of the first buffer layer away from the second buffer layer.

33. The child safety seat according to claim 32, wherein the second buffer layer and the third buffer layer are both foam layers, and a thickness of the second buffer layer is 10 mm to 40 mm.

* * * * *